United States Patent [19]
Kuus

[11] 3,873,079
[45] Mar. 25, 1975

[54] BELLEVILLE SPRING CARTRIDGE

[75] Inventor: Felix Kuus, Huntington Beach, Calif.

[73] Assignee: Byron Jackson Inc., Long Beach, Calif.

[22] Filed: Jan. 4, 1974

[21] Appl. No.: 430,980

[52] U.S. Cl. ............................................. 267/162
[51] Int. Cl. ............................................ F16f 1/34
[58] Field of Search .................... 267/162, 151, 165

[56] References Cited
UNITED STATES PATENTS
2,939,663  6/1960  Suozzo ............................... 267/162
FOREIGN PATENTS OR APPLICATIONS
857,611  1/1961  United Kingdom ................. 267/162

Primary Examiner—James B. Marbert
Attorney, Agent, or Firm—John O. Evans, Jr.

[57] ABSTRACT

A number of Belleville spring discs are held in coaxial relation by inner and outer split retainer rings which are expansible by the springs when the springs are deflected axially and spread at their peripheries. The retainer rings have V-shaped grooves receiving the peripheries of the springs to afford clearance space and minimize friction during deflection of the springs. One of the axially spaced retaining flanges of the retainer rings projects radially beyond the other flange to facilitate assembly.

18 Claims, 9 Drawing Figures

PATENTED MAR 25 1975  3,873,079

SHEET 2 OF 2

BELLEVILLE SPRING CARTRIDGE

BACKGROUND OF THE INVENTION

In numerous applications where spring force is needed, particularly a large spring force capable of overcoming a heavy load, coiled springs have been limited in their use because of the great space required. In addition, inherent in coiled springs is a variable spring rate, the force required to deflect the spring increasing as the deflection increases.

Frusto-conical spring discs or so-called Belleville springs are not only capable of having very high strength for the space occupied, but have or can be constructed and preloaded to have a constant spring rate. When Belleville springs are assembled in coaxial stacks, in peripheral engagement, the peripheries of the discs when centered, say on an inner body or outer body to maintain concentricity of the discs engage the centering means and resultant hysteresis may render the spring system faulty or nonuniform in its operation.

THE PRIOR ART

Spring washers have heretofore been stacked in coaxially arranged sets and centered by various spacer rings and the like, for example, as shown in the following prior U.S. Letters Pat. Nos.:

1,826,597, Oct. 6, 1931, W. A. Brecht,
2,020,927, Nov. 12, 1935, E. E. Arnold, et al.,
3,010,713, Nov. 28, 1961, Turkovich.

SUMMARY OF THE INVENTION

The present invention provides a Belleville spring assembly wherein a number of the disc springs are retained in coaxial relation at their peripheries in a novel manner.

More particularly, the present invention provides a Belleville spring assembly wherein the frusto-conical or dished discs are arranged in coaxial, alternately reversed relation and retained in a concentric stack by inner and outer, split snap rings or retainer rings which have edge flanges extending about the contacting peripheral edges of the spring discs to hold the discs assembled, while allowing radial displacement when the discs are deflected by axial pressure.

Between the flanges of the snap rings are grooves which are concave or V-shaped in section, whereby the peripheral edges of the discs are free to move radially during deflection, without interference with the snap ring body.

To facilitate assembly of the snap rings with the fisc springs, one of the radial flanges on the periphery of the snap rings may be radially longer than the other.

A number of Belleville springs retained together as described above is adapted to be easily assembled in association with a support structure having an abutment for one end of the spring pack and a pressure applying member engageable with the other end of the spring pack, and the overall assembly provides a spring unit with great compressive strength in a small space, as compared with the usual coiled compression spring. Moreover, the disc spring pack can be preloaded and have over the significant range of compression a constant spring rate. The snap rings minimize frictional coengagement between the discs and any other centering means, thereby minimizing hysteresis. The axial dimension of the snap rings, moreover, will limit the extent to which the spring pack can be compressed.

This invention possesses many other advantages, and has other purposes which may be made more clearly apparent from a consideration of the forms in which it may be embodied. These forms are shown in the drawings accompanying and forming part of the present specification. They will now be described in detail, for the purpose of illustrating the general principals of the invention; but it is to be understood that such detailed descriptions are not to be taken in a limiting sense, since the scope of the invention is best defined by the appended claims.

DESCRIPTION OF THE PREFERRED EMBODIMENT

Figure 4:
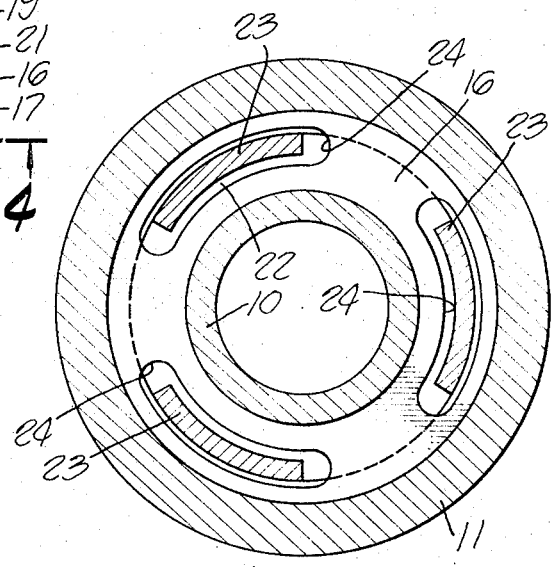
FIG. 4 is a transverse section as taken on the line 4—4 of FIG. 1.

The Belleville spring cartridge, as herein illustrated, comprises an inner sleeve 10 disposed within an outer tubular body 11 and supported by the latter in an upper support ring 12, threaded at 13 into the body 11, the inner sleeve 92 having a supporting collar 14 threaded thereon and engaged with the ring 12. At its lower end, the sleeve 10 receives in a seat 15 a lower support ring 16 which also seats at 17 in the outer body 11. Beneath the upper ring 12 is a stop ring 18 against which an uppermost Belleville spring 19 abuts at its inner periphery in a seat 20, the lowermost Belleville spring 21 abutting at its inner periphery with a thrust collar 22. As seen in FIG. 4, the thrust collar 22 has downwardly extending fingers 23 spaced circumferentially which extend through circumferentially spaced arcuate slots or openings 24 in the lower ring 16 into abutting contact with the upper end of a member 25, upward movement of which causes corresponding upward movement of the thrust collar 22 and compression of the Belleville springs 19 and 21. The Belleville springs are preferred because they occupy a relatively small space as compared with conventional coiled compression springs and provide a high load spring which, as is well known, can have a constant spring rate. The cartridge thus far described, may, for example, be utilized as the spring unit of the "Annulus Pressure Controlled Testing Apparatus," disclosed in the copending application for U.S. Letters Patent, filed contemporaneously herewith in the name of Lyle B. Scott.

The Belleville springs 19 and 21 are centralized or maintained in pairs and in concentric relation with respect to one another without contacting either the outer housing 11 or the inner support sleeve 10 by means of outer peripheral centering rings 26 and inner peripheral centering rings 27. The stack of Belleville springs, as a whole, is centralized on the upper ring 18 and on the lower thrust collar 22. Each outer centering ring 26 is radially split at 26a and each inner centering ring 27 is radially split at 27a, these rings being resiliently expansible to facilitate their application to the peripheries of the Belleville springs as well as to minimize constraint of the peripheral or radial expansion which occurs as the frusto-conical springs are axially deformed. In addition, the inner periphery of each of the outer peripheral centering rings 26 is provided with a circumferentially extended groove 26b and the outer periphery of each of the inner peripheral centering rings 27 is provided with a corresponding groove 27b, these grooves 26b and 27b being generally V-shaped, as best seen in FIGS. 2 and 5, and affording clearance space enabling the contacting edges of the Belleville springs 26 and 27 to expand outwardly and inwardly, respectively, upon axial deflection, thereby minimizing friction and resultant hysteresis.

At the upper and lower inner edges of the outer centering ring 26 are retainer flanges 26c which project radially inwardly and retain the contacting peripheries of adjacent Belleville spring washers in assembled relation at their outer peripheries. Corresponding radial flanges 27c engage the inner peripheries of the Belleville springs to retain the same in assembled relation. Thus, the entire stack of Belleville springs can be installed as a unit over the upper end of the inner support member 10 before assembly of the stop ring 18 and the upper ring 12 on the support sleeve 10. The collar 14 can be threaded downwardly on the sleeve 10 to appropriately preload the Belleville spring assembly before it is installed in the housing 11 to enable a substantially constant spring rate when the thrust collar 22 is moved toward the stop ring 18.

Figure 1:
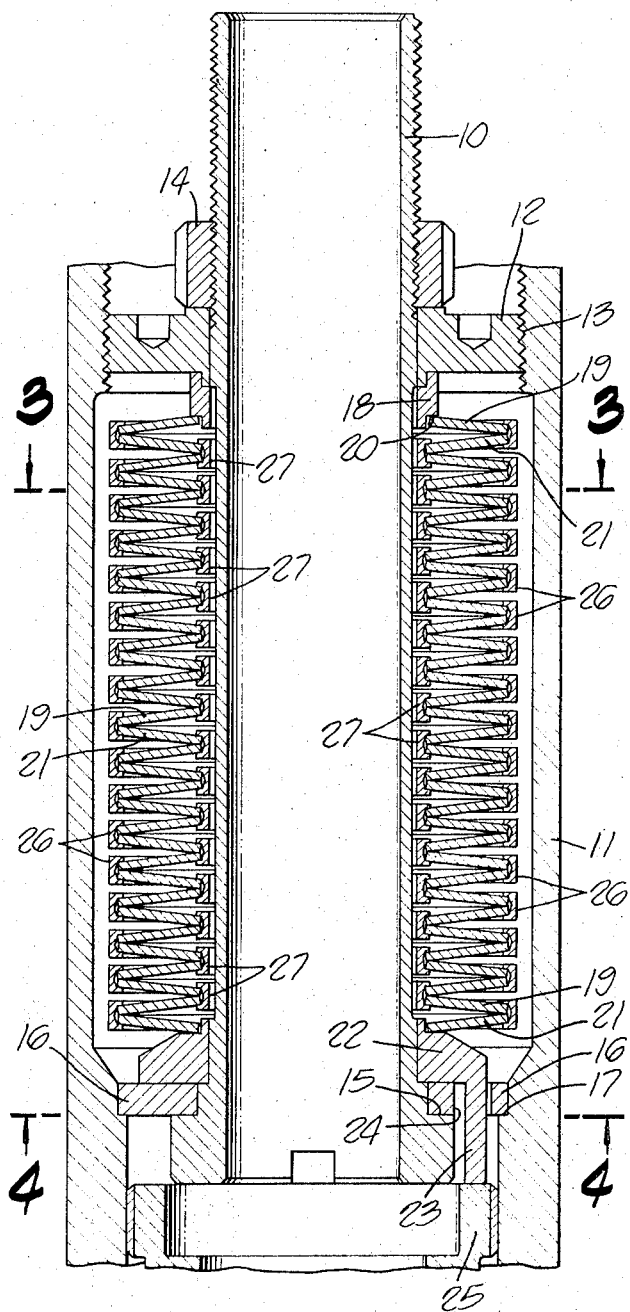
FIG. 1 is a fragmentary view in longitudinal section of a Belleville spring assembly made in accordance with the invention.
Figure 2:
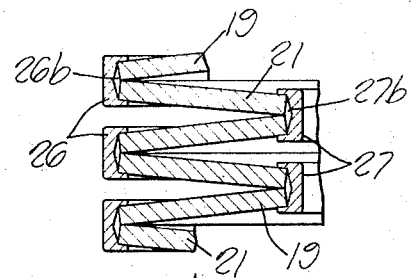
FIG. 2 is an enlarged fragmentary view in longitudinal section showing a number of the springs retained in assembly by the peripheral snap rings.
Figure 3:
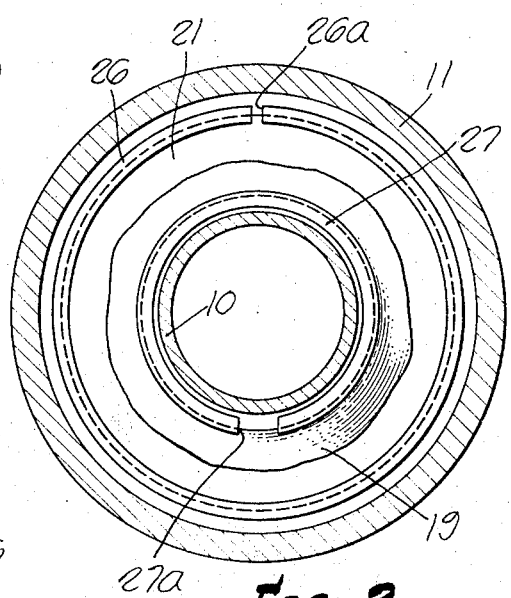
FIG. 3 is a transverse section as taken on the line 3—3 of FIG. 1.
Figure 5:
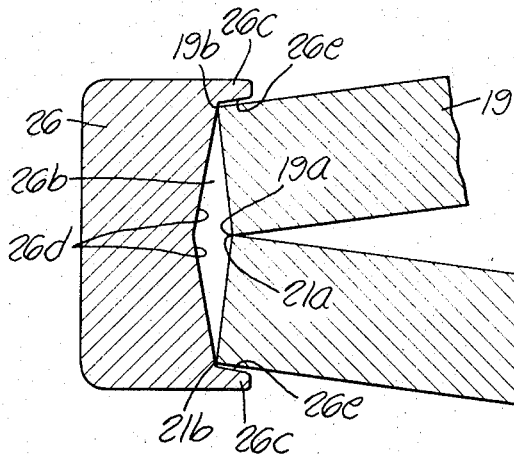
FIG. 5 is an enlarged fragmentary detail view in longitudinal section, illustrating the relationship between the peripheries of the disc springs and the grooved snap rings.
Figure 6:
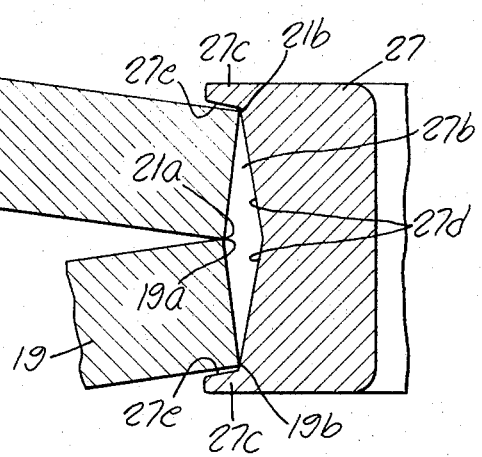
FIG. 6 is a plan view of an outer peripheral snap ring, with a portion broken away.
Figure 6:
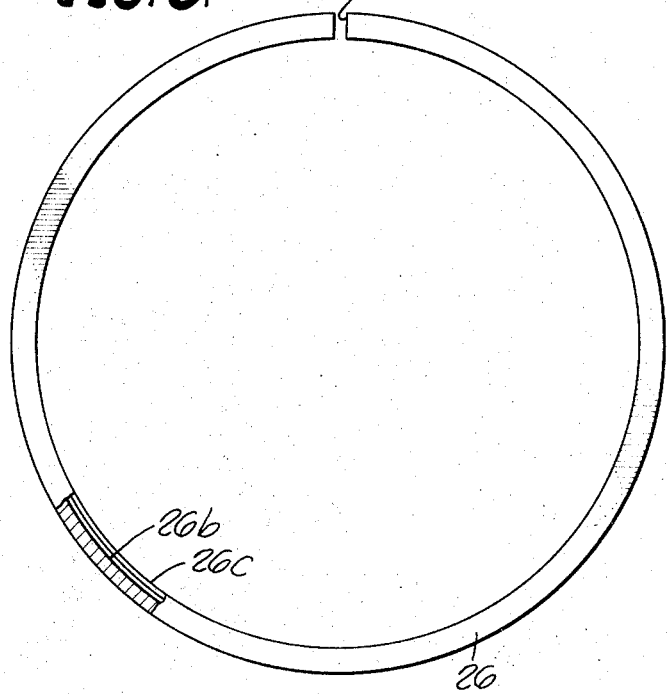
Figure 7:
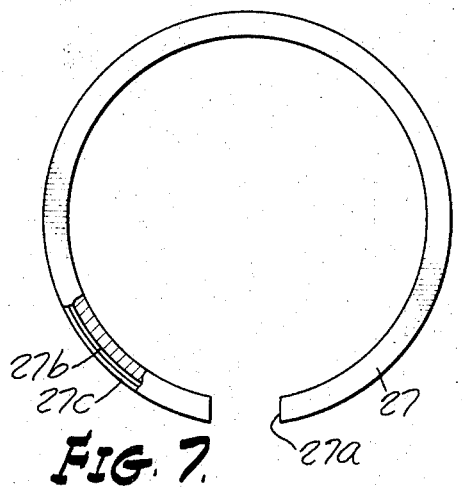
FIG. 7 is a plan view of an inner peripheral snap ring, with a portion broken away.

As seen in FIGS. 2 and 5, the grooves 26b and 27b in the respective retaining rings 26 and 27 are generally V-shaped. The purpose of this V-shape is to provide adequate clearance space so that the converging walls 26d and 27d will not interfere with the opposing contacting corners 19a and 21a of the spring washers 19 and 21 on the peripheral walls of the springs, as the springs progressively flatten and expand outwardly and inwardly at the peripheral corners 19a and 21a. In other words, the grooves 26b and 27b are sufficiently deep at their deepest point to allow the disc springs 19 and 21 to be axially deformed to the maximum extent, and the converging walls 26d and 27d will not be contacted by the opposing peripheral edges of the respective discs 19 and 21.

The inwardly projecting flanges 26c and the outwardly projecting flanges 27c serve to constrain the disc springs 19 and 21 against axial separation. The flanges 26c and 27c, moreover, preferably have opposing walls 26e and opposing walls 27e which diverge radially inwardly and outwardly, respectively, at such an angle that when the disc springs are preloaded as mentioned above, the flanges 26c and 27c are not in physical frictional contact with the disc springs 19 and 21.

The only frictional contact between the disc springs 19 and 21 and the rings 26 and 27 occurs at the upper outer peripheral edges 19b of the disc spring 19 and the upper and lower peripheral edges 21b of the disc spring 21, where the disc springs 19 and 21 are in contact with the inner periphery of the outer retainer ring 26 and the outer periphery of the retainer ring 27. Frictional resistance to recovery of the disc springs 19 and 21 caused by such contact between the disc springs 19 and 21 and the respective retainer rings 26 and 27 is minimized by forming the rings of relatively resilient material with which the edges, referred to above, have a lower coefficient of friction and by providing the above described splits at 26a and 27a, whereby the retainer rings 26 and 27 are enabled to expand and contract circumferentially.

In use the retaining rings 26 and 27 serve to centralize or maintain the concentricity of the disc springs 19 and 21 within the annular space defined between the inner tubular support 10 and the outer housing or body 11, with the pack of disc springs 19 and 21 centralized by the upper stop ring 18 and the thrust collar 22. With such a construction, it will also be apparent that the axial deflection of the disc springs is limited, since the axial dimension of the retainer rings 26 and 27 is greater than the combined thickness of the disc springs 19 and 21, the retainer rings 26 and 27 will abut with one another.

In addition, in order to minimize friction, the axial spacing between the junction of the flanges 26c and the flanges 27c with the respective groove walls 26d and 27d is such that the corners 19b and 21b have clearance space as shown in FIG. 5 throughout the entire range of their axial movement.

Figure 8:
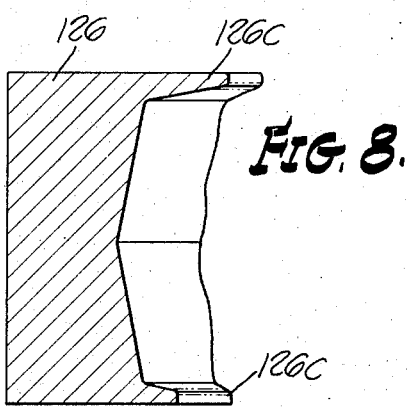
FIG. 8 is an enlarged radial section showing a modified outer peripheral snap ring form.
Figure 9:
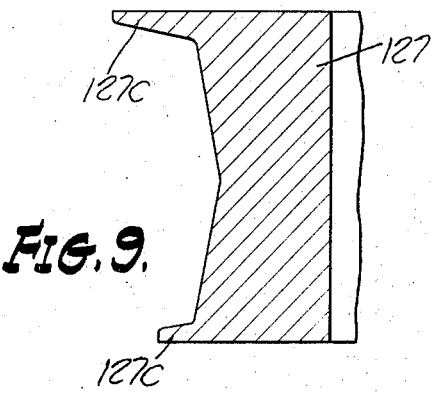
FIG. 9 is an enlarged radial section showing a modified inner peripheral snap ring form.

In FIGS. 8 and 9, somewhat modified external retainer rings 126 and internal retainer rings 127 are illustrated wherein the upper inner edge flange 126c and the upper outer edge flange 127c project radially inwardly a distance greater than the inward projection of the lower inner edge flange 126c of the outer retainer ring 126 and the upper outer edge flange 127c projects radially outwardly a distance greater than the lower outer peripheral edge flange 127c of the inner retainer ring 127. This construction facilitates the installation of the retainer rings 126 and 127 about and within the peripheries of the disc springs 19 and 21 prior to assembly of the pack of springs on the body 10 and preloading of the springs.

I claim:

1. A spring assembly comprising: a pair of axially spaced abutment members, means for thrusting one of said abutment members towards the other, and Belleville spring washer means interposed between and in contact with said abutment members for biasing said abutment members relatively apart, said Belleville spring washer means comprising a plurality of Belleville spring washers disposed in coaxial relation and having peripheral edges in mutual contact, and peripheral retainer ring means engaged with the peripheries of said washers that have peripheral edges in contact, said retainer ring means including radially split resiliently deformable rings receiving said peripheries and having means confining said peripheral edges in said mutual contact.

2. A spring assembly as defined in claim 1, wherein each of said rings has a pair of radially projecting pe- 3. A spring assembly as defined in claim 1, wherein each of said rings has a pair of radially projecting peripheral flanges forming a groove receiving said peripheries of said washers, one of said flanges projecting into overlying relation to said washers a distance greater than the other of said flanges.

4. A spring assembly as defined in claim 1, wherein each of said rings has a pair of radially projecting peripheral flanges forming a groove receiving said peripheries of said washers, one of said flanges projecting into overlying relation to said washers a distance greater than the other of said flanges, each of said rings having walls between said flanges forming a clearance space for accommodating the edges of said washers as said washers are axially deformed and expand circumferentially.

5. A spring assembly as defined in claim 1, wherein each of said rings has a pair of radially projecting peripheral flanges forming a groove receiving said peripheries of said washers, one of said flanges projecting into overlying relation to said washers a distance greater than the other of said flanges, each of said rings having walls between said flanges forming a clearance space for accommodating the edges of said washers as said washers are axially deformed and expand circumferentially, said flanges be spaced apart axially a distance greater than the combined thickness of the peripheries of said washers when said washers are deformed axially.

6. A spring assembly as defined in claim 1, wherein said rings are provided at inner and outer said peripheries of said washers.

7. A spring assembly as defined in claim 1, wherein said rings are provided at inner and outer said peripheries of said washers, each of said inner and outer rings having a pair of radially projecting peripheral flanges forming a groove receiving said peripheries of said washers.

8. A spring assembly as defined in claim 1, wherein said rings are provided at inner and outer said peripheries of said washers, each of said inner and outer rings having a pair of radially projecting peripheral flanges forming a groove receiving said peripheries of said washers, one of said flanges projecting into overlying relation to said washers a distance greater than the other of said flanges.

9. A spring assembly as defined in claim 1, wherein said rings are provided at inner and outer said peripheries of said washers, each of said inner and outer rings having a pair of radially projecting peripheral flanges forming a groove receiving said peripheries of said washers, one of said flanges projecting into overlying relation to said washers a distance greater than the other of said flanges, each of said rings having walls between said flanges forming a clearance space for accommodating the edges of said washers as said washers are axially deformed and expand circumferentially.

10. A spring assembly as defined in claim 1, wherein said rings are provided at inner and outer said peripheries of said washers, each of said inner and outer rings having a pair of radially projecting peripheral flanges forming a groove receiving said peripheries of said washers, one of said flanges projecting into overlying relation to said washers a distance greater than the other of said flanges, each of said rings having walls between said flanges forming a clearance space for accommodating the edges of said washers as said washers are axially deformed and expand circumferentially, said flanges being spaced apart axially a distance greater than the combined thickness of the peripheries of said washers when said washers are deformed axially.

11. A spring assembly as defined in claim 1, wherein said radially split resiliently deformable rings are preloaded into circumferential contact with said peripheries of said washers.

12. A spring assembly as defined in claim 1, wherein said radially split and resiliently deformable retainer rings are preloaded into circumferential contact with said peripheries of said washers.

13. A spring assembly comprising: an elongated inner body, stop means on said inner body, a thrust collar shiftable on said inner body towards and away from said stop means, a support for said body, a stack of frusto-conical spring washers interposed between said stop means and said thrust means with portions of their respective inner and outer peripheries in contact, and inner and outer retainer rings engaged with adjacent spring washers at their respective inner and outer contacting peripheries, each of said retainer rings being radially split and resiliently deformable to enable expansion and contraction of said rings.

14. A spring assembly as defined in claim 13, each of said inner and outer rings having radially projecting peripheral flanges forming a groove receiving the contacting peripheries of said washers.

15. A spring assembly as defined in claim 13, each of said inner and outer rings having radially projecting peripheral flanges forming a groove receiving the contacting peripheries of said washers, one of said flanges projecting into overlying relation to said washers a distance greater than the other of said flanges.

16. A spring assembly as defined in claim 13, each of said inner and outer rings having radially projecting peripheral flanges forming a groove receiving the contacting peripheries of said washers, one of said flanges projecting into overlying relation to said washers a distance greater than the other of said flanges, each of said rings having walls between said flanges forming a clearance space for accommodating the edges of said washers as said washers are axially deformed and expand circumferentially.

17. A spring assembly as defined in claim 13, each of said inner and outer rings having radially projecting peripheral flanges forming a groove receiving the contacting peripheries of said washers, one of said flanges projecting into overlying relation to said washers a distance greater than the other of said flanges, each of said rings having walls between said flanges forming a clearance space for accommodating the edges of said washers as said washers are axially deformed and expand circumferentially, said flanges being spaced apart axially a distance greater than the combined thickness of the peripheries of said washers when said washers are deformed axially.

18. A spring assembly as defined in claim 13, including means adjustably supporting said stop means on said body to allow said spring washers to be preloaded.

* * * * *